(12) United States Patent
Yoshizawa et al.

(10) Patent No.: US 8,973,947 B2
(45) Date of Patent: Mar. 10, 2015

(54) PROTECTIVE PLATE MOUNTING STRUCTURE FOR A FUEL TANK

(75) Inventors: Yuji Yoshizawa, Sakura (JP); Ryutaro Inaba, Sakura (JP)

(73) Assignee: Yachiyo Industry Co., Ltd., Sayama-Shi, Saitama (JP)

( * ) Notice: Subject to any disclaimer, the term of this patent is extended or adjusted under 35 U.S.C. 154(b) by 239 days.

(21) Appl. No.: 12/737,627

(22) PCT Filed: Jul. 29, 2009

(86) PCT No.: PCT/JP2009/003589
§ 371 (c)(1),
(2), (4) Date: Jan. 31, 2011

(87) PCT Pub. No.: WO2010/016204
PCT Pub. Date: Feb. 11, 2010

(65) Prior Publication Data
US 2011/0127761 A1   Jun. 2, 2011

(30) Foreign Application Priority Data

Aug. 8, 2008   (JP) .................................. 2008-205596

(51) Int. Cl.
*B60K 15/03* (2006.01)
*F02M 37/00* (2006.01)

(52) U.S. Cl.
CPC . *B60K 15/03177* (2013.01); *B60K 2015/03467* (2013.01); *B60K 2015/03032* (2013.01); *F02M 37/0076* (2013.01)
USPC ........................... 280/834; 29/525.01; 29/453

(58) Field of Classification Search
USPC ................ 280/830, 834; 29/525.01, 453, 463
See application file for complete search history.

(56) References Cited

U.S. PATENT DOCUMENTS

| 2,245,751 | A | * | 6/1941 | Blackmore ................... 411/201 |
| 2,876,485 | A | * | 3/1959 | Cowles ........................ 16/42 R |
| 3,110,068 | A | * | 11/1963 | Perrochat ....................... 24/297 |
| 3,286,871 | A | * | 11/1966 | Eberline ...................... 220/4.14 |
| 4,023,257 | A | * | 5/1977 | Wright et al. .................. 29/460 |
| 4,140,177 | A | * | 2/1979 | Ivie, Sr. ..................... 165/134.1 |

(Continued)

FOREIGN PATENT DOCUMENTS

| EP | 0453139 A1 | 10/1991 |
| GB | 2208283 A | 3/1989 |

(Continued)

*Primary Examiner* — Anne Marie Boehler
*Assistant Examiner* — Maurice Williams
(74) *Attorney, Agent, or Firm* — Marshall & Melborn, LLC

(57) ABSTRACT

A protective plate can be mounted to a fuel tank without using costly melt bonding and insert blow molding. A mounting recess is formed in the peripheral wall of a fuel tank (1) formed by blow molding, and a fixing element (3) for fixing a protective plate (2) to the fuel tank (1) can engage with the mounting recess. The mounting recess is open in two directions, that is, in the direction of mold removal in the blow molding and in the direction of the thickness of the protective plate which direction is generally perpendicular to the direction of the mold removal. The fixing element comprises a first clip (6) provided with elastic leg sections (62) fitted in the mounting recess in the direction of the mold removal, and also comprises a second clip (7) provided with elastic leg sections (72) penetrating through the protective plate and fitting in the first clip in the direction of the thickness of the protective plate. The protective plate is sandwiched between the first and second clips.

3 Claims, 5 Drawing Sheets

(56) References Cited

U.S. PATENT DOCUMENTS

| | | | |
|---|---|---|---|
| 4,143,193 A * | 3/1979 | Rees | 220/555 |
| 4,234,050 A * | 11/1980 | Condon | 180/190 |
| 4,597,153 A * | 7/1986 | Zaydel | 29/434 |
| 4,653,762 A * | 3/1987 | Nakamura et al. | 280/835 |
| 4,712,637 A * | 12/1987 | Mogi et al. | 180/219 |
| 4,930,811 A * | 6/1990 | Tsukada et al. | 280/834 |
| 4,934,886 A * | 6/1990 | Aikens | 411/85 |
| 5,067,575 A | 11/1991 | Hyde et al. | |
| 5,409,264 A * | 4/1995 | Nakatani | 280/834 |
| 5,419,035 A * | 5/1995 | Twigg | 29/798 |
| 5,634,665 A * | 6/1997 | Jung | 280/834 |
| 5,775,860 A | 7/1998 | Meyer | |
| 6,213,514 B1 * | 4/2001 | Natsume et al. | 280/833 |
| 6,401,961 B1 * | 6/2002 | Butler | 220/562 |
| 6,412,163 B1 * | 7/2002 | Russell | 29/453 |
| 6,857,537 B2 | 2/2005 | Yonezawa | |
| 6,931,730 B2 * | 8/2005 | Elliott et al. | 29/897.2 |
| 7,045,708 B2 | 5/2006 | Miura et al. | |
| 7,174,617 B2 * | 2/2007 | Wright | 29/428 |
| 7,401,394 B1 * | 7/2008 | Muller | 29/432.1 |
| 7,497,290 B2 * | 3/2009 | Marsala et al. | 180/69.1 |
| 8,096,034 B2 * | 1/2012 | Barvosa-Carter et al. | 29/419.1 |
| 8,122,604 B2 * | 2/2012 | Jannot et al. | 29/897.2 |
| 2003/0198506 A1 | 10/2003 | Yonezawa | |
| 2007/0220735 A1 * | 9/2007 | Arbona et al. | 29/525.01 |
| 2007/0235089 A1 * | 10/2007 | Koike | 137/565.17 |
| 2008/0310931 A1 * | 12/2008 | Csik et al. | 411/103 |
| 2009/0266944 A1 * | 10/2009 | Mominee et al. | 248/67.7 |
| 2009/0307942 A1 * | 12/2009 | Gamble et al. | 37/232 |
| 2010/0044991 A1 * | 2/2010 | Luna | 280/124.175 |
| 2011/0024583 A1 * | 2/2011 | Hoernig | 248/201 |

FOREIGN PATENT DOCUMENTS

| | | |
|---|---|---|
| GB | 2261639 A | 5/1993 |
| JP | 54-58613 U | 4/1979 |
| JP | 62-3324 | 1/1987 |
| JP | 1-73024 U | 5/1989 |
| JP | 2003-291669 A | 10/2003 |
| JP | 2005-343324 A | 12/2005 |
| JP | 2008-037230 A | 2/2008 |
| WO | 2005059375 A1 | 6/2005 |

* cited by examiner

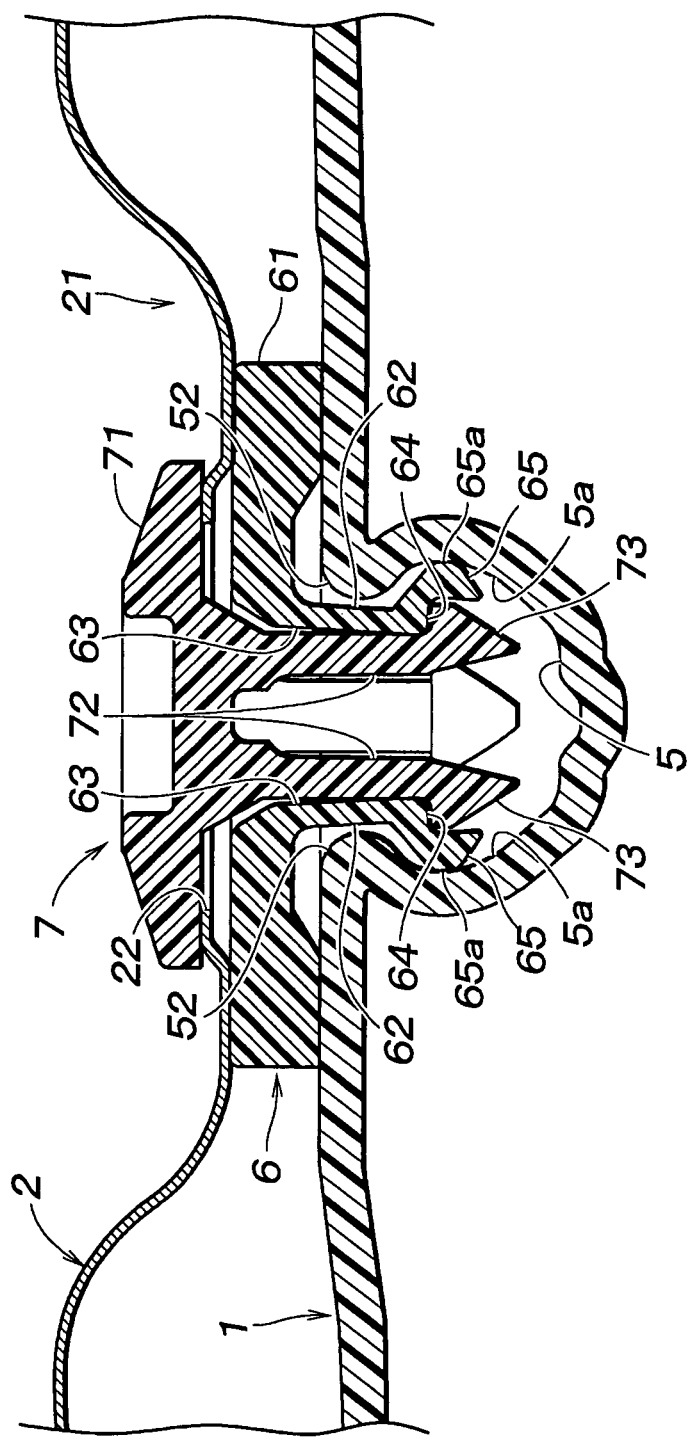

PROTECTIVE PLATE MOUNTING STRUCTURE FOR A FUEL TANK

TECHNICAL FIELD

The present invention relates to a protective plate mounting structure for mounting a protective plate to a fuel tank, and in particular, to a protective plate mounting structure for a fuel tank manufactured by blow molding plastic material.

BACKGROUND OF THE INVENTION

A fuel tank mounted on a vehicle is typically provided with a protective plate for shielding the fuel tank from the heat of an exhaust pipe. Conventionally, a protective plate is secured to projections formed in the fuel tank by using suitable fasteners. Patent document 1 discloses a structure for securing the protective plate to a mounting boss provided on the fuel tank by using a clip in the form of a sheet spring, and patent document 2 discloses a structure for securing a protective plate to the fuel tank by using nuts threaded with bolts fixed to the fuel tank.
Patent document 1: Japanese laid open patent 2008-37230
Patent document 2: Japanese patent 4034104

BRIEF SUMMARY OF THE INVENTION

Task to be Accomplished by the Invention

When the fuel tank is made by blow molding plastic material, a projection for securing a protective plate is typically formed by welding a plastic member or by using an insert blow molding process. However, these methods may create problems as will be discussed in the following.

In the case of welding a plastic mounting member, the manufacturing cost is high because the welding machine must be adapted to different vehicle models; the shape of the fuel tank and hence, the mounting positions of the mounting members vary from one model to another. Furthermore, because of the differences in the requirements of the plastic materials for the fuel tank and the plastic mounting member, two different plastic materials must be properly welded to each other, necessitating an increase in the manufacturing cost. In the case of the insert blow molding process, again, the manufacturing cost increases because of the addition of the work step of placing an insert member in the mold.

This invention was made with the aim of eliminating such problems of the prior art, and has a primary object of providing a protective plate mounting structure for mounting a protective plate to a fuel tank, which does not require a costly process of welding or insert blow molding.

Means to Accomplish the Task

To achieve such an object, the present invention provides a protective plate mounting structure for mounting a protective plate to a fuel tank manufactured by blow molding, characterized by that a peripheral wall of the fuel tank is formed with a mounting recess for engaging a mounting member for securing the protective plate to the fuel tank, the mounting recess being configured to open out in a removal direction for removing the fuel tank from a blow molding mold and a thickness-wise direction of the protective plate which is substantially perpendicular to the removal direction.

In this case, the mounting member may be disposed so as to join the protective plate and the fuel tank to each other by being passed through a hole passed through the protective plate in the thickness-wise direction in a part thereof corresponding to the mounting recess. The mounting recess may have a cross-sectional shape which is narrow at the open end in the thickness-wise direction of the protective plate so that the mounting member may not be dislodged in the thickness-wise direction of the protective plate. Thereby, the recess may not be required to have an undercut in the removal direction so that the mold is not required to have a slide core or an ejector pin for forcing the molded product from the mold. Therefore, the structure of the mold can be simplified.

In this protective plate mounting structure for mounting a protective plate to a fuel tank, the mounting member may comprise a first clamping member configured to be fitted into the mounting recess in the removal direction, and a second clamping member including an engagement portion passed through the protective plate and engaging the first clamping member in the thickness-wise direction, the first and second clamping members jointly clamping the protective plate.

In this protective plate mounting structure for mounting a protective plate to a fuel tank, the engagement portion of the first clamping member may comprise a plurality of resilient legs resiliently engaging mutually opposing surfaces of the mounting recess.

In this protective plate mounting structure for mounting a protective plate to a fuel tank, the engagement portion of the second clamping member may comprise a plurality of resilient legs press fitted into a gap between the resilient legs of the first clamping member.

In this protective plate mounting structure for mounting a protective plate to a fuel tank, the mounting recess may be formed on each of two parts of the fuel tank molded by two different halves of the blow molding mold.

Effect of the Invention

Thus, according to the present invention, the mounting recess can be formed at the time of the blow molding process without requiring a welding process, thereby eliminating the problems associated with the welding process such as an increase in the manufacturing cost because of the need to prepare different welding machines for different models or the need to weld two different plastic materials. Also, no additional work step such as that required in the insert blow molding process is needed so that an increase in the manufacturing cost may be avoided. In particular, because the mounting recess for securing the mounting member to the fuel tank opens out in the removal direction for the blow molding process and the direction substantially perpendicular to it, the need for a slider core or an ejector pin for forcing the molded product out of the mold is eliminated, and this allows the cost for the mold to be minimized.

When the mounting member comprises a first clamping member configured to be fitted into the mounting recess in the removal direction and a second clamping member including an engagement portion passed through the protective plate and engaging the first clamping member in the thickness-wise direction so that the first and second clamping members jointly clamp the protective plate, the protective plate can be firmly attached to the fuel tank.

When the engagement portion of the first clamping member comprises a plurality of resilient legs resiliently engaging mutually opposing surfaces of the mounting recess, the resiliency of the resilient legs restricts the dislodgement of the first clamping member from the mounting recess in the removal direction so that the efficiency of the assembly work can be improved.

When the engagement portion of the second clamping member comprises a plurality of resilient legs press fitted into a gap between the resilient legs of the first clamping member, the resiliency of the resilient legs of the second clamping member restricts the inward deformation or deflection of the resilient legs of the first clamping member so that the resiliencies of the resilient legs of the first and second clamping members jointly prevent the first clamping member from being dislodged from the mounting recess, and the dislodgement of the first and second clamping members from the mounting recess can be positively prevented.

When the mounting recess is formed on each of two parts of the fuel tank molded by two different halves of the blow molding mold, as the open ends of the removal direction of the two mounting recesses are opposite to each other, one of the first clamping members opposes the dislodgement of the other first clamping member from the corresponding mounting recess so that the detachment of the protective plate from the fuel tank can be positively prevented.

BRIEF DESCRIPTION OF THE DRAWINGS

FIG. 5 is a cross-sectional view of the protective plate mounting structure of the fuel tank in the assembled state.

Figure 1:
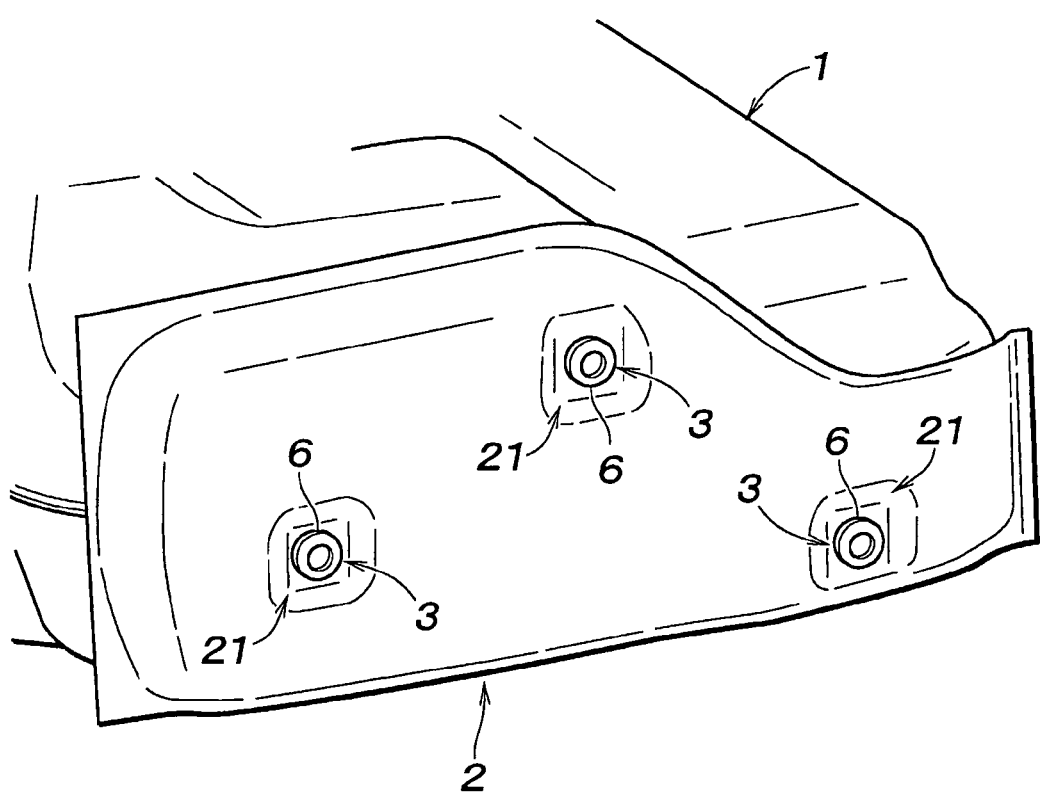
FIG. 1 is a fragmentary perspective view of the protective plate mounting structure of the fuel tank embodying the present invention.

DESIGNATED NUMERALS 1 fuel tank
2 protective plate
3 mounting member
5 mounting recess, 5a side surface
6 first clip (first clamping member)
7 second clip (second clamping member)
21 recess
22 mounting hole
51 engagement portion
52 ridge
53 guide portion
55 seat surface
61 head
62 resilient leg
63 center hole
64 step portion
65 projection, 65a peak
71 head
72 resilient leg
73 engagement claw

DETAILED DESCRIPTION OF THE PREFERRED EMBODIMENTS

A preferred embodiment of the present invention is described in the following with reference to the appended drawings.

Figure 2:
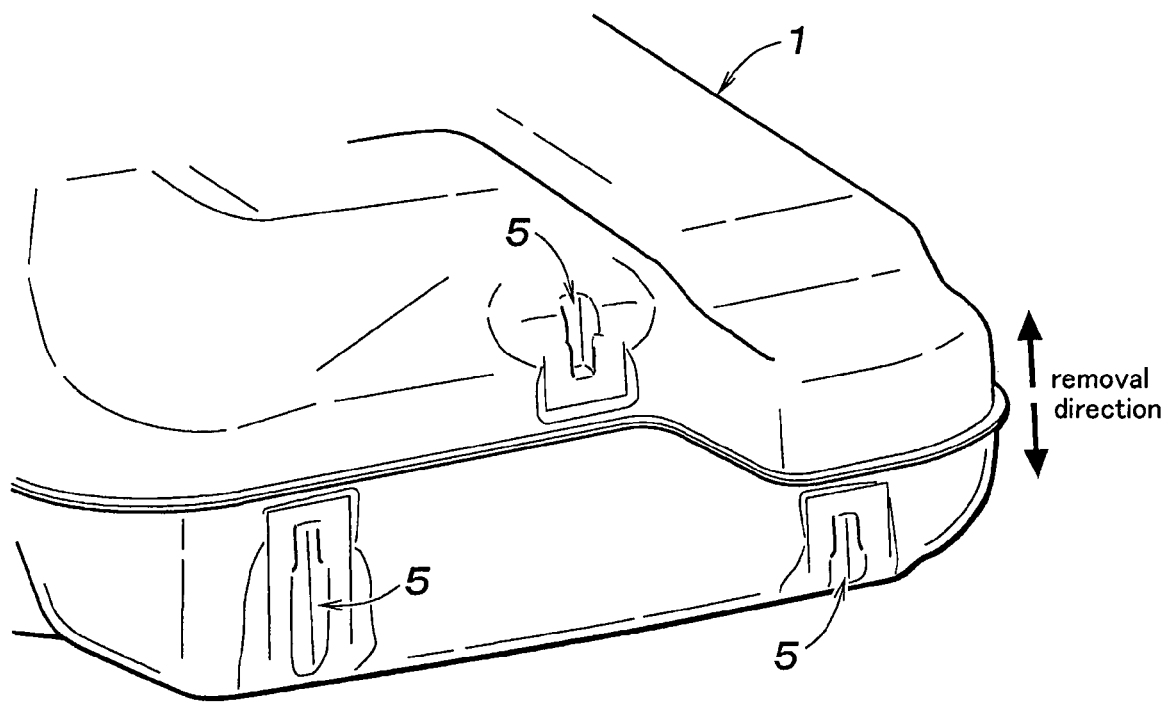
FIG. 2 is a perspective view of the fuel tank of FIG. 1.

FIG. 1 is a perspective view of the protective plate mounting structure of the fuel tank embodying the present invention, and FIG. 2 is a perspective view of the fuel tank of FIG. 1.

Referring to FIG. 1, a protective plate 2 (heat shield plate) is attached to a side wall of a fuel tank 1 by using a plurality (three in the illustrated embodiment) of mounting members 3. The protective plate 2 substantially covers a side wall of the fuel tank 1, and has a substantially planar central part and a peripheral part which has a curved cross-sectional shape so as to present a convex surface on an outer side thereof conforming to the outer contour of the fuel tank 1. Recesses 21 each having a concave outer surface are formed in the parts of the protective plate corresponding to the parts of the fuel tank 1 where the mounting members are to be attached.

The fuel tank 1 is made by blow molding plastic material, and has multi-layered structure including a barrier material layer sandwiched between a pair of thermoplastic resin layers. As shown in FIG. 2, a side of the fuel tank 1 is formed with a plurality of mounting recesses 5 (for securing the mounting members 3) at the time of blow molding. The mounting recesses 5 are provided on the two parts of the fuel tank 1 corresponding to the two halves of the blow molding mold.

Figure 3:
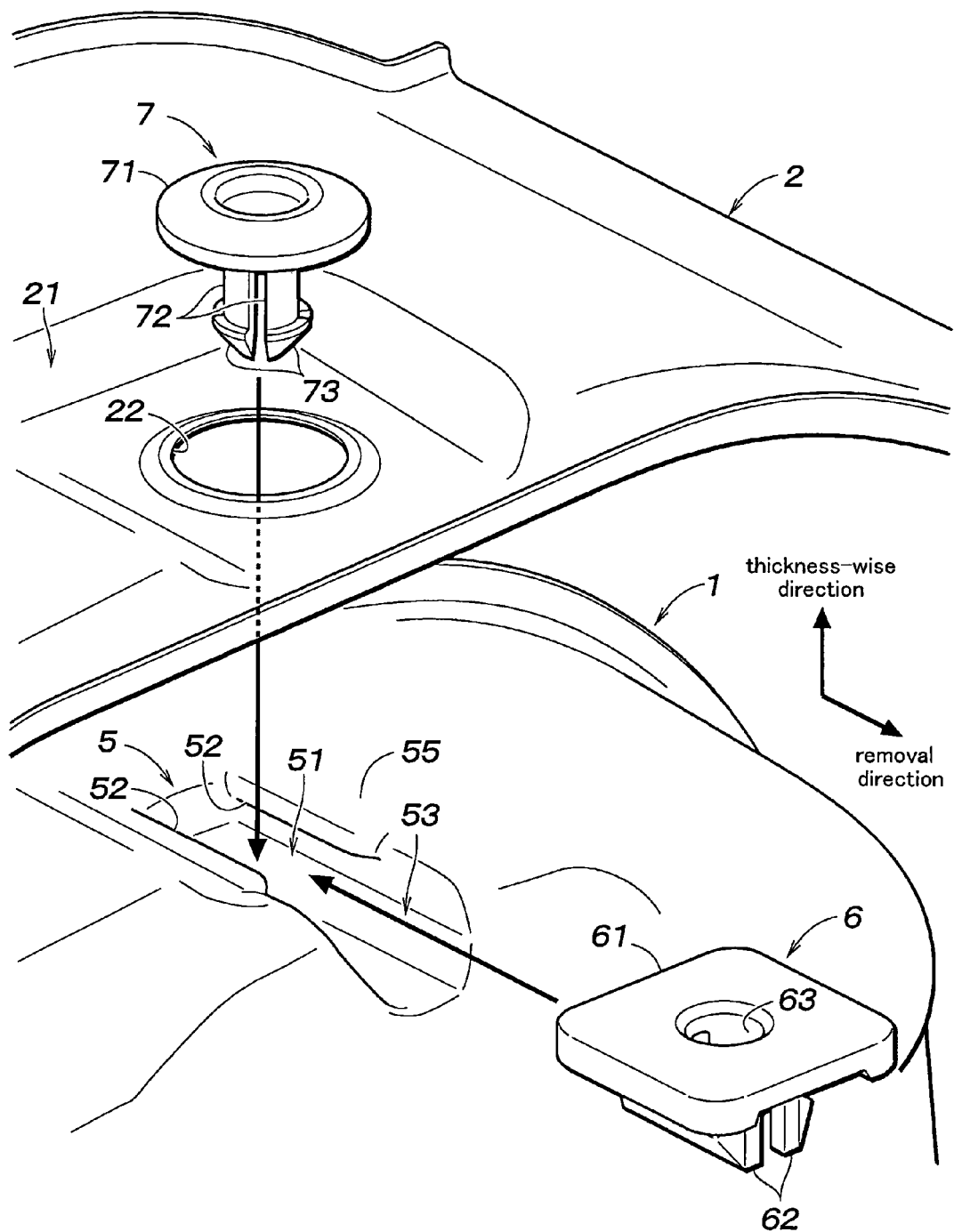
FIG. 3 is an exploded perspective view of the protective plate mounting structure of the fuel tank of FIG. 1.
Figure 4:
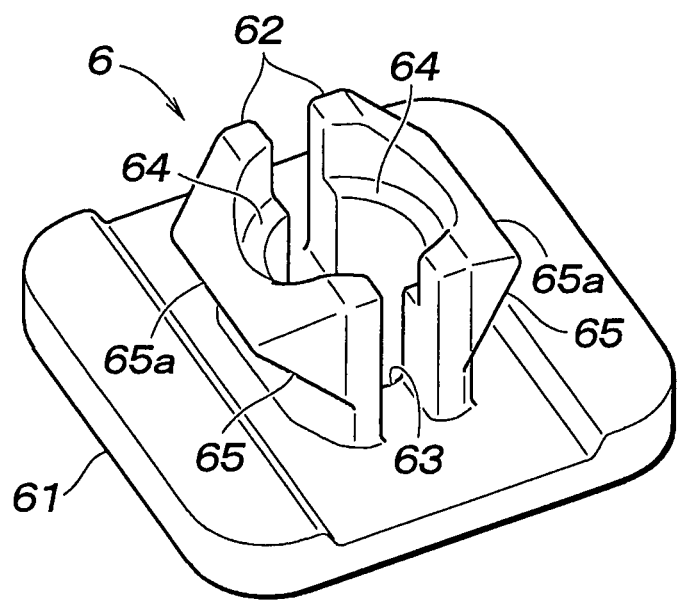
FIG. 4 is a perspective view of the first clip of FIG. 3.

FIG. 3 is an exploded perspective view of the protective plate mounting structure of the fuel tank of FIG. 1. FIG. 4 is a perspective view of the first clip of FIG. 3, and FIG. 5 is a cross-sectional view of the protective plate mounting structure of the fuel tank of FIG. 3 in the assembled state.

Each mounting member 3 comprises a first clip (first clamping member) 6 and a second clip (second clamping member) 7. The first clip 6 is secured to the fuel tank 1 by being introduced into the mounting recess 5 in the removal direction. The second clip 7 is passed through the protective plate 2, and is fitted into the first clip 6 in the thickness-wise direction. Thereby, the protective plate 2 is clamped between the first clip 6 and the second clip 7.

The first clip 6 includes a head 61 for clamping the protective plate 2 in cooperation with the second clip 7 and a plurality (a pair, in the illustrated embodiment) of resilient legs 62 configured to be engaged by the mounting recess 5. The first clip 6 may be made of an integral plastic member (such as polyamide) having a prescribed resiliency.

In the same manner, the second clip 7 includes a head 71 for clamping the protective plate 2 in cooperation with the first clip 6, and a plurality (four in the illustrated embodiment) of resilient legs 72 configured to be engaged by the first clip 6. The second clip 7 also may be made of an integral plastic member such as polyamide.

Each mounting recess 5 of the fuel tank 1 opens out in the removal direction for removing the molded product from the mold at the time of blow molding (see FIG. 2), and the thickness-wise direction of the protective plate 2 which is substantially perpendicular to the removal direction. The inner part of the mounting recess 5 with respect to the removal direction is formed with an engagement portion 51 for engaging the resilient legs 62 of the first clip 6. The engagement portion 51 has a substantially C-shaped cross section having a narrow inlet owing to a pair of ridges 52 protruding inwardly toward each other.

An outer end of the mounting recess 5 with respect to the removal direction is formed with a guide portion 53 to guide the resilient legs 62 of the first clip 6 to the engagement portion 51. The guide portion 53 has a substantially U-shaped cross section so that the resilient legs 62 of the first clip 6 can be fitted into the guide portion 53 from above, and the attachment of the first clip 6 can be simplified.

The head 61 of the first clip 6 is formed as a rectangular plate, and has a front surface engaging the protective plate 2 and a rear surface engaging a seat surface 55 formed around the mounting recess 5 of the fuel tank 1. The head 61 is formed with a central hole 63 for receiving the resilient legs 72 of the second clip 7.

The two resilient legs 62 extend from the rear surface of the head 61 in the direction of the central line of the central hole 63 and are symmetric with respect to the central line. The inner side of each resilient leg 62 is given with an arcuate cross section conforming with the central hole 63 of the head 61. The inner side of each resilient leg 62 is also formed with a step portion 64 extending circumferentially around the central line of the central hole 63. The outer side of each resilient leg 62 is formed with a projection 65 protruding outwardly. The projection 65 has a smooth contour such that a peak 65a extends linearly in parallel with the rear surface of the head 61.

The two resilient legs 62 are elastically deformable so as to vary the gap therebetween, such that when the resilient legs 62 are forced into the mounting recess 5 as shown in FIG. 3, the resilient legs 62 elastically deform inwardly until the peaks 65a of the projections 65 resiliently engage the opposing side surfaces 5a of the mounting recess 5 as shown in FIG. 5. At this time, the projections 65 of the resilient legs 62 are restrained by the two ridges 52 formed in the mounting recess 5 so that the clip 6 is prevented from being dislodged from the mounting recess 5 in the thickness-wise direction of the protective plate 2. Also, the pressure from the resilient legs 62 restrains the first clip 6 from being dislodged from the mounting recess 5 in the removal direction.

As shown in FIG. 3, the second clip 7 has a disc shaped head 71. From the rear surface of the head 71 extend a plurality of resilient leg 72 in the direction of the central line, and an engagement claw 73 given with a taper is formed in the free end of each resilient leg 72. The resilient legs 72 are passed through the mounting hole 22 of the protective plate 2 until the rear surface of the head 71 is engaged by the protective plate 2. The head 71 is exposed on the outer side of the protective plate 2, but received in the recess 21 of the protective plate 2.

The resilient legs 72 can generally elastically deformable in a radially inward direction so that when the resilient legs 72 are force into the central hole 63 of the first clip 6 via the mounting hole 22 of the protective plate 2, the resilient legs 72 elastically deform in a radially inward direction causing the engagement claws 73 formed in the free ends thereof to pass through the central hole 63. Then, as shown in FIG. 5, the resilient legs 72 are fitted into the gap between the two resilient legs 62 of the first clip 6, and the engagement claws 73 in the free ends thereof engage the step portions 64 formed on the inner sides of the resilient legs 62 of the first clip 6, thereby preventing the second clip 7 from being dislodged from the first clip 6. As a result, the part of the protective plate 2 surrounding the mounting hole 22 is clamped between the head 61 of the first clip 6 and the head 71 of the second clip 7.

At the same time, the resilient legs 72 of the second clip 7 are resiliently pressed against the resilient legs 62 of the first clip 6, and the resilient force of the resilient legs 72 of the second clip 7 restricts the inward deformation of the resilient legs 62 of the first clip 6. As the resilient forces of the resilient legs 62 and 72 of the first and second clips 6 and 7 jointly prevent the dislodgement of the first clip 6 from the mounting recess 5, the first and second clips 6 and 7 are positively prevented from being dislodged from the mounting recess 5.

When the protective plate 2 is attached to the fuel tank 1 by means of the first and second clips 6 and 7, an external force tends to push the second clip 7 inward. Such an external force promotes the engagement of the second clip 7 with the first clip 6, and ensures a secure attachment of the protective plate 2 to the fuel tank 1.

As the mounting recesses 5 are formed in different parts of the fuel tank 1 corresponding to two halves of the mold for blow molding, and the open ends of the mounting recesses 5 directed in the removal directions are opposite in direction from each other as shown in FIG. 2, the first clips 6 are prevented from being dislodged from the respective mounting recesses 5, and the protective plate 2 can be kept securely attached to the fuel tank 1 in a reliable manner.

In the illustrated embodiment, the first clamping member consisted of a clip configured for resilient engagement. However, the first clamping member may also consist of a rigid member configured to be fitted into the mounting recess without any elastic deformation or to be press fitted into the mounting recess. In the illustrated embodiment, the second clamping member also consisted of a clip configured for resilient engagement. However, it may also consist of a threaded member configured to be threaded into the central hole of the second clamping member. Forming the clamping members as clips configured for resilient engagement as in the illustrated embodiment is advantageous in simplifying the assembly work and in reducing the amount of work required for the manufacture.

The illustrated embodiment used two clips (first and second clamping members) 6 and 7 as the mounting member, but it is also possible to form the mounting member with a single clip. In the latter case, the clip may be integrally incorporated with the retaining portion for retaining the protective plate 2 and an engagement portion that can be securely fitted into the mounting recess in the thickness-wise direction of the protective plate 2.

The invention claimed is:

1. A protective plate mounting structure for mounting a protective plate to a fuel tank defining a fuel retaining compartment, characterized by that:
   a peripheral wall of the fuel tank is formed with a mounting recess for engaging a mounting member for securing the protective plate to the fuel tank, the peripheral wall being defined by an outer surface in which the mounting recess is formed and an inner surface that defines the fuel retaining compartment,
   the mounting recess is configured to open out in a thickness-wise direction of the protective plate and a removal direction which is substantially perpendicular to the thickness-wise direction,
   an inner part of the mounting recess with respect to the removal direction opening out in the thickness-wise direction via a narrow inlet defined by a pair of ridges protruding inwardly toward each other for restraining a part of the mounting member,
   the mounting member comprises a first clamping member configured to be fitted into the mounting recess in the removal direction and a second clamping member including an engagement portion passed through the protective plate and engaging the first clamping member in the thickness-wise direction, the first and second clamping members jointly clamping the protective plate,
   an engagement portion of the first clamping member comprises a plurality of resilient legs resiliently engaging mutually opposing surfaces of the mounting recess, and
   the engagement portion of the second clamping member comprises a plurality of resilient legs press fitted into a gap between the resilient legs of the first clamping member.

2. The protective plate mounting structure according to claim 1, wherein the mounting recess is formed on each of two parts of the fuel tank molded by two different halves of the blow molding mold.

3. The protective plate mounting structure according to claim 1, wherein the first clamping member further comprises a head having a surface that engages the outer surface of the peripheral wall of the fuel tank around the mounting recess.

* * * * *